UNITED STATES PATENT OFFICE.

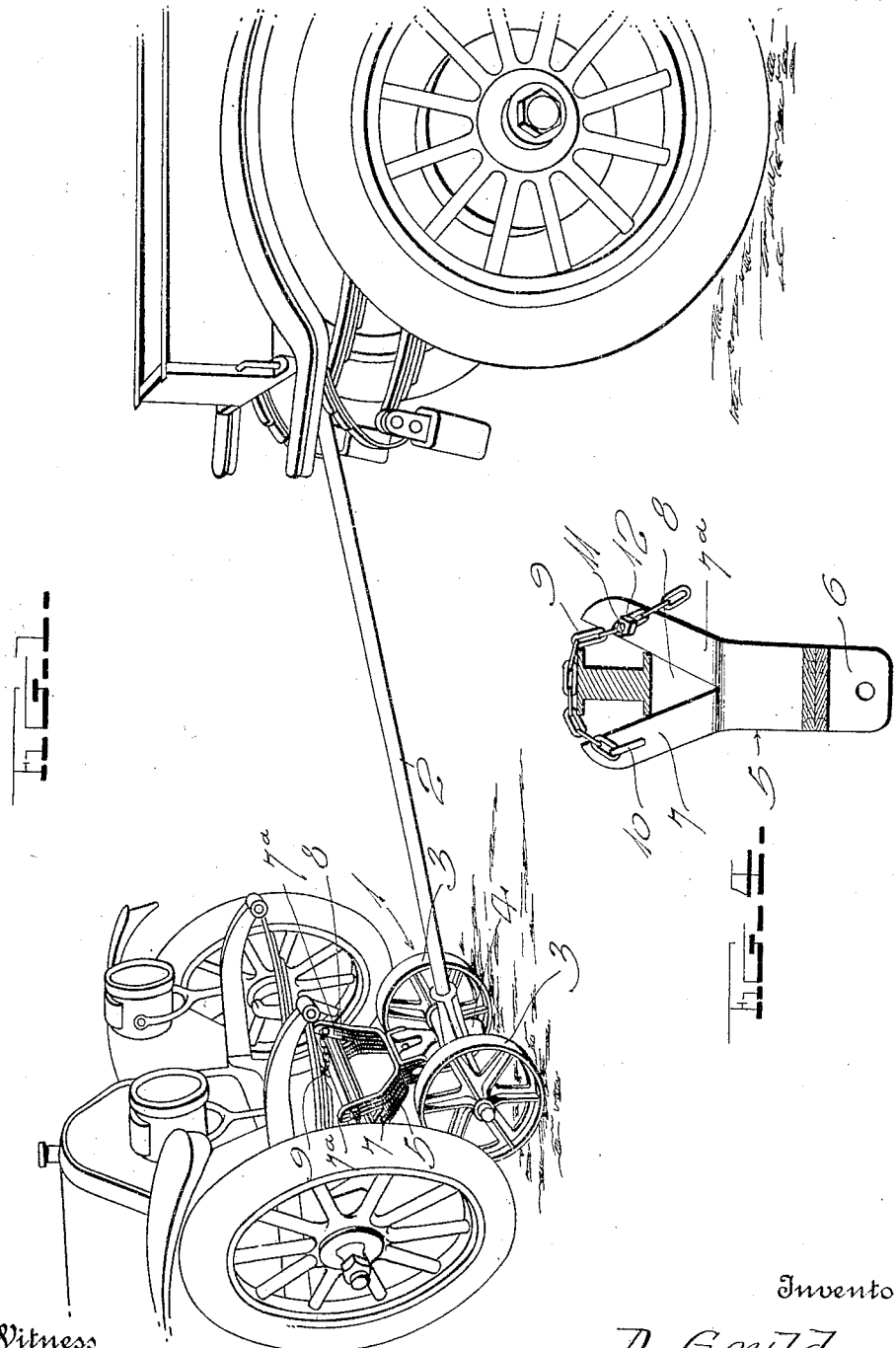

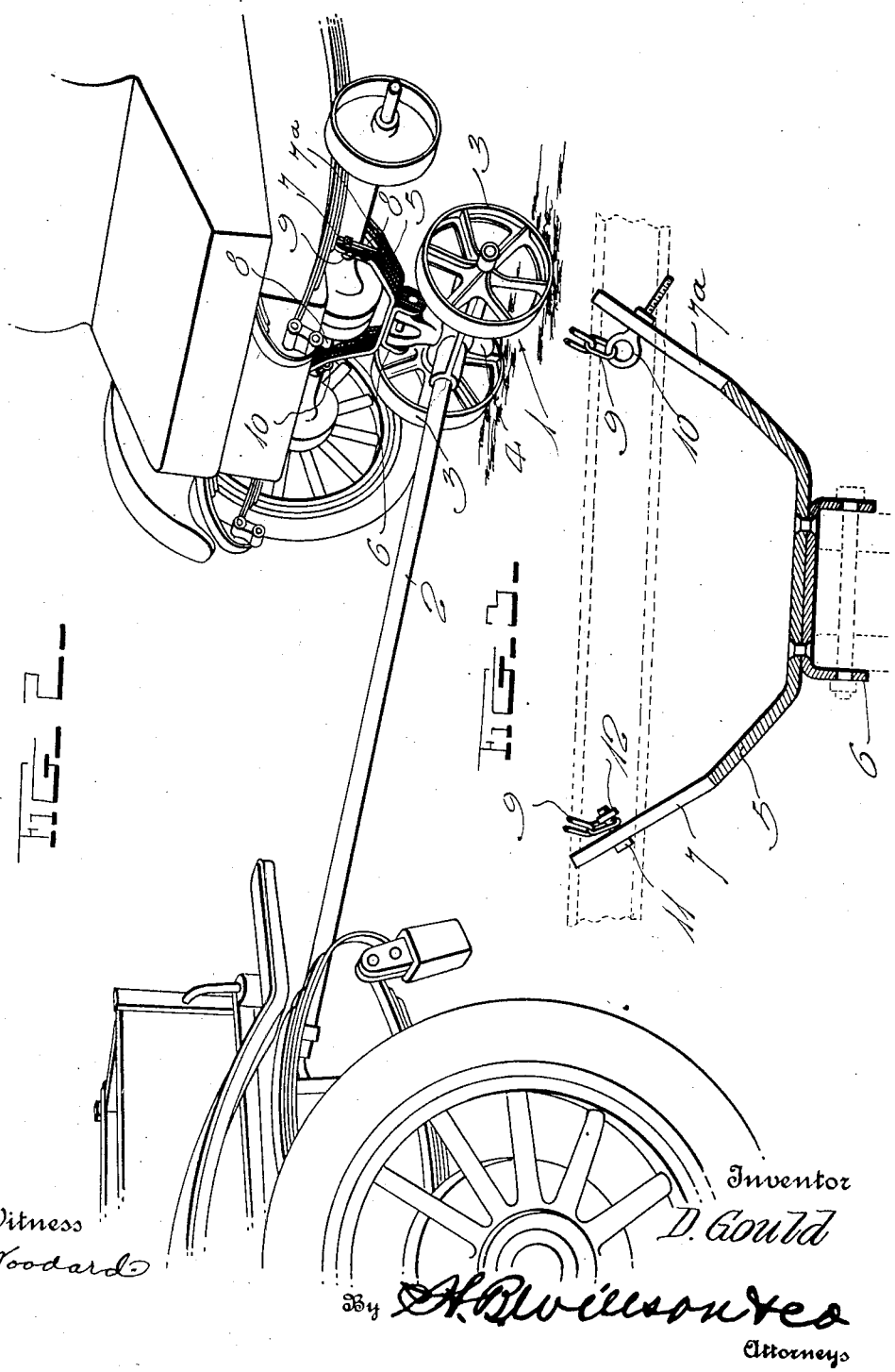

DAN GOULD, OF SACRAMENTO, CALIFORNIA.

WRECKING-TRUCK.

1,349,198.  Specification of Letters Patent.  Patented Aug. 10, 1920.

Application filed January 19, 1920. Serial No. 352,452.

*To all whom it may concern:*

Be it known that I, DAN GOULD, a citizen of the United States, residing at Sacramento, in the county of Sacramento and State of California, have invented certain new and useful Improvements in Wrecking-Trucks, and I do declare the following to be a full, clear, and exact description of the invention, such as will enable others skilled in the art to which it appertains to make and use the same.

This invention relates to an improved wrecking truck which is to be used to support one end of an axle or the entire end of an automobile which has been wrecked and is inoperative because of the loss of one or more wheels, the use of this device enabling the wrecked machine to be towed to a suitable place for repairing the same.

The principal object of the invention is to provide a device of the above mentioned character which may be readily attached to either the front or rear axle of a vehicle, being held in effective engagement with the axle by means of chains or the like, the whole device being of such construction that it may be operated by a single person in a great deal less time than any devices of this character now known to me, which devices generally require from two to three men to manipulate them, thus consuming considerable time and doubling the expense.

Another object of the invention is to provide a device of the above mentioned character which is of such construction that it may be used in the manner of a jack by placing the axle engaging member beneath the axle and pushing down on the tongue, thus raising the vehicle.

A further object of the invention is to provide a device of the above mentioned character which is extremely simple in construction, light in weight, yet extremely strong and durable, and inexpensive to both the manufacturer and the user.

Other objects and advantages of the invention will be apparent during the course of the following description.

In the accompanying drawings forming a part of this specification, and in which like numerals are employed to designate like parts throughout the same;

Figure 1 is a perspective view of a device constructed in accordance with my invention, showing the manner in which it is used when in engagement with the front axle of a vehicle.

Fig. 2 is a view similar to Fig. 1 showing the manner in which the device is used when connected to the rear axle of a vehicle.

Fig. 3 is a longitudinal section of the axle engaging yoke.

Fig. 4 is a transverse section on the plane of the line 4—4 of Fig. 3.

In the drawings, wherein for the purpose of illustration is shown a preferred embodiment of my invention, the numeral 1 designates, as a whole, a wheeled support which includes a tongue 2, wheels 3, and a vertical pivot 4 including an apertured head. The foregoing parts are essential to promote effective use of my device, although I do not desire to limit myself to the particular construction of these parts as shown, as any other type of wheeled support including the foregoing parts may also be effectively used.

My invention resides in the construction of the axle engaging yoke 5, which is equipped with a substantially channel-shaped plate 6 the lateral bent ends of which are apertured and secured to the head of pivot pin 4. I desire it to be understood that this member 6 will be of a different design when used in connection with differently constructed wheeled supports. The yoke member 5 is constructed from a single piece of flat metal which is bent into a substantial U. Each end of the metal is split longitudinally and forced apart to form a pair of diverging arms 7 and 7ª. This construction forms V-shaped notches 8 at opposite ends of the yoke, which are adapted to receive the axle therein and straddle the same in the manner shown more clearly in Fig. 4. I have found by making the notch of the shape described, that the device may be effectively used in connection with practically all of the automobiles now on the market. After the axle has been seated in the notches 8, it is retained in position in these notches by means of flexible retaining members, which I have here shown in the form of chains 9, each of which is secured at one of its ends to an eye-bolt 10 carried by the arm 7, whereupon it may be passed over the top of the axle and one of the links thereof secured upon the bolt 11 carried by the other arm 7ª. This construction permits the device to be used with axles of various shapes and sizes. In other words, the aforesaid construction enables the chain 9 to be adjusted to fit axles of different sizes. After the chain has been properly adjusted and over the bolt 11 it is retained in position thereon by means of a nut 12.

The operation of the device is as follows: Assuming that one, or maybe both of the front wheels of a vehicle have been completely broken off due to collision or some other accident, the device is placed beneath the front axle. It may be that the axle is extremely close to the ground and the height of the truck will not permit it to be easily placed beneath the axle. To overcome this difficulty, it will be necessary only to tilt truck 4 forward, and engage it beneath the axle, whereupon downward pressure on the handle will raise the axle up off of the ground. It is in this manner that the device serves the function of a jack. After the axle has been properly seated in the notches 8, the chains will be secured in position and the free end of the tongue will be connected to the tow-vehicle in any suitable manner, whereupon the wrecked car may be towed to a garage for repairs. The wrecked car needs no driver, and it may be towed at a good rate of speed. The same operation will be applied in connecting the truck to the rear axle. The chains 9 will at all times retain the axle in the notches 8 even if the route of travel is rough.

From the foregoing description taken in connection with the accompanying drawings, it is believed that the operation and advantages of the device are entirely obvious. Further description is therefore deemed unnecessary.

I claim:

A device of the class described comprising a wheeled truck, including a vertical pivot which has an apertured head at its upper end, an axle engaging member composed of upper and lower metal strips secured together at their centers, the lower strip having its ends bent down to provide attaching ears, the latter being provided with apertures which are alined with the apertures in said head, a fastening member extending through said apertures, the upper strip being bent to form a substantial U and having its ends longitudinally split and forced apart to form V-shaped notches, of a size and depth to receive either a front or rear automobile axle therein, the member itself being of a size to accommodate and straddle the differential housing when a rear axle is seated in said notches.

In testimony whereof I have hereunto set my hand.

DAN GOULD.